United States Patent Office 3,028,520
Patented Apr. 3, 1962

3,028,520
PULSE GENERATOR
Roger W. Wolfe, South Plainfield, and David Glaser, Greenbrook, N.J., assignors to Burroughs Corporation, Detroit, Mich., a corporation of Michigan
Filed July 13, 1960, Ser. No. 42,586
7 Claims. (Cl. 315—8.5)

This invention relates to pulse-generating circuits and particularly to such circuits useful for generating trains of accurately spaced pulses having a controllably variable pattern of distribution which may be varied as desired.

There are many areas of electronic circuitry in which trains of pulses arranged according to a code are used to transmit intelligence. One type of apparatus useful for generating trains of electrical pulses is known as a multiple position beam switching tube and includes a plurality of electrode groups, from each of which an output signal may be obtained. By properly connecting selected ones of the output electrodes, a train of pulses having a desired arrangement may be achieved. In this type of circuit, the time spacing of the pulses is controlled by the beam switching tube. In general, a beam switching tube is satisfactory for this purpose; however, under some circumstances where extremely accurately timed pulses are required and where such pulses require accurate shaping, a magnetron beam switching tube is not completely satisfactory as used in the prior art.

Accordingly, the principles and objects of the present invention are directed toward the provision of an improved circuit utilizing a magnetron beam switching tube or other multiple position device to provide a train of accurately timed and formed pulses.

The circuit of the invention includes a multiple position beam switching tube as one of its components; however, the timing of the pulses in a pulse train is not completely dependent on the timing accuracy of the tube but is more directly controlled by a source of clock pulses of great accuracy. Briefly, the source of accurately timed clock pulses is coupled both to driving means for switching an electron beam from position to position in the multiple position device, and it is also connected to a first control element of a gating device. Each of the output electrodes of the multiple position device is also adapted to be connected to a second control element of the gating device. In order to obtain a train of pulses having a predetermined time spacing, the properly spaced output electrodes of the multiple position device are coupled to the gating device. Each clock pulse applied to the driving means switches an electron beam in a multiple position device by one position. As the beam reaches a target which is connected to the gating device, a pulse is applied which coincides with the application of a clock pulse thereto. The coincident application of these two pulses to the gating device provides an output pulse therefrom. An output pulse is thus obtained from the gating device each time the electron beam in the multiple position device flows to an output electrode which is coupled to the gating device. The train of accurately spaced pulses thus obtained depends only on the accuracy of the clock pulses and it is not affected by the switching accuracy of the multiple position device.

The invention is described in greater detail by reference to the drawing wherein.

Figure 1:
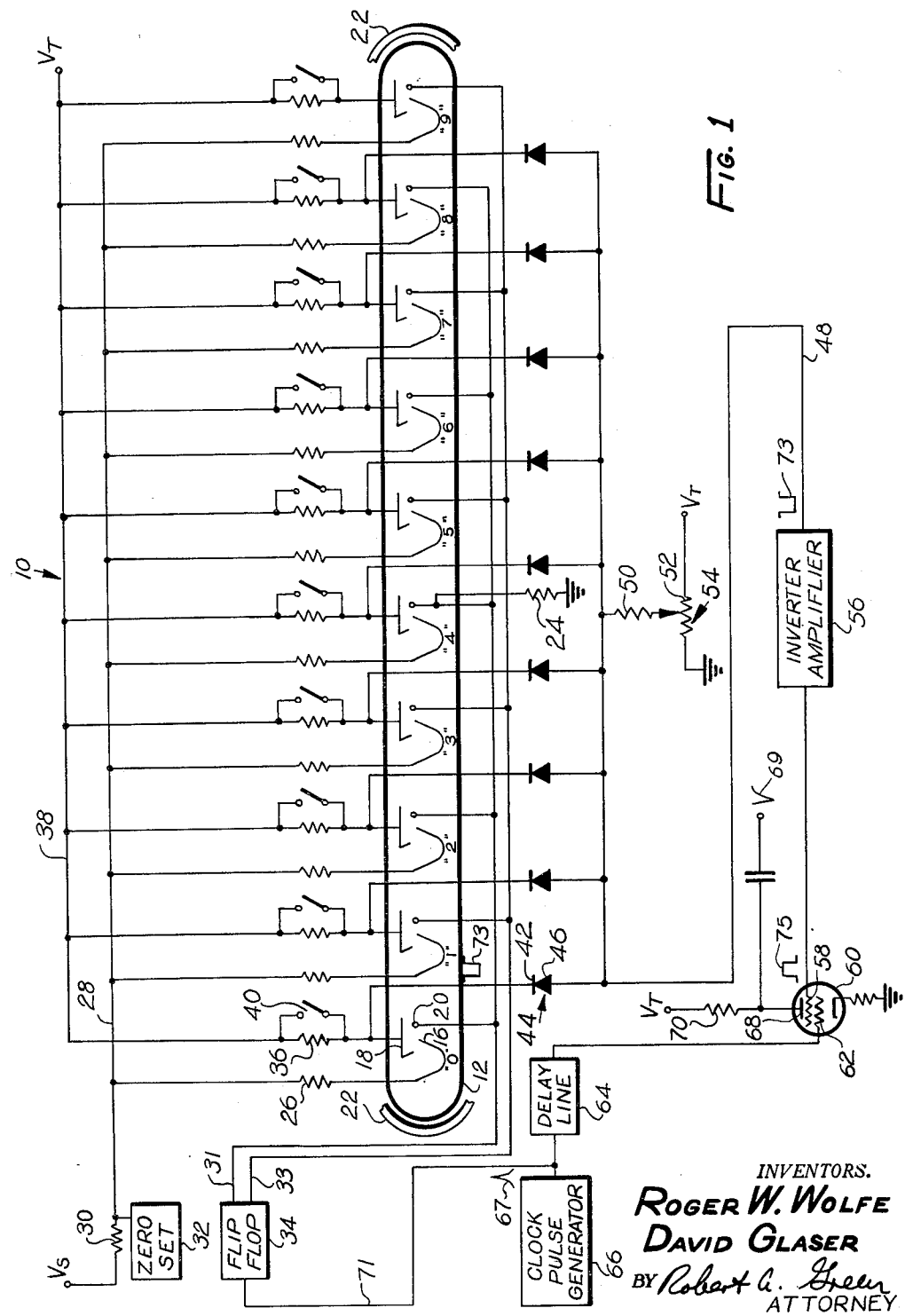
FIG. 1 is a schematic representation of a circuit embodying the invention.

The circuits described below are particularly suitable for use with a multi-position type 6700 magnetron beam switching tube. In actual construction, this type of tube is cylindrical in form and is shown schematically in linear form as tube 10 in FIG. 1. The tube includes an envelope 12 which contains a central longitudinally elongated cathode 14 and ten groups of electrodes spaced radially equidistantly from the cathode and surrounding the cathode. The groups of electrodes are shown numbered "0," "1," "2" . . . "9." Each group of electrodes includes a generally U-shaped elongated spade electrode 16 and a generally L-shaped target electrode 18 positioned so that each target occupies the space between adjacent spade electrodes. Each spade electrode serves to form and hold an electron beam on its corresponding target electrode. A generally rod-like switching electrode 20 is also included in each group of electrodes and is positioned between one edges of each target electrode and the adjacent spade electrode. The switching electrodes are known as switching grids. An open-ended cylindrical permanent magnet 22, shown schematically, is provided surrounding the tube envelope and coaxial therewith. The magnet provides an axial magnetic field which is utilized in conjunction with electric fields within the tube to form and switch an electron beam from the cathode to each of the groups of electrodes. The direction in which the beam switches, that is clockwise or counter-clockwise, is always the same and is determined by the orientation of the electric and magnetic fields.

Briefly, in operation of tube 10, electrons emitted by the cathode are retained at the cathode if each of the spades, targets and switching grids carries its normal operating electrical potential. When a spade is suitably lowered in potential, an electron beam is formed and directed to the corresponding target electrode. The electron beam may be switched from one target electrode to the next by thus suitably altering the electrical potentials of a spade or switching grid. Under normal operating conditions, whenever electrode voltages are such that a beam might be supported at several positions, the beam will switch to the most leading position and lock in at this position.

Referring to the drawing, and particularly to tube 10, the cathode 14 is connected through a suitable resistor 24 to a source of reference potential such as ground. Each of the spade electrodes 16 is coupled through a spade load resistor 26 to a spade buss 28. The spade buss 28 is coupled through a common spade resistor 30 to a suitable positive D.C. power supply $V_S$. A suitable zero-set circuit 32 for clearing an electron beam in the tube and resetting it at the "0" position is coupled to the spade buss and the spade electrode at the "0" position. A typical zero-set circuit operates by first reducing the potential of the spade buss to a level at which a beam cannot be maintained at any position and then holding the "0" spade at a lower voltage level than the other spades until a beam forms at the "0" position.

The switching grid electrodes 20 are connected in two sets with the grids at the even-numbered positions in one set and the grids at the odd-numbered positions in the other set. The sets of grids are connected by leads 31 and 33 to the outputs of a flip-flop circuit 34. As first one and then the other output of the flip-flop operates, a beam in tube 10 is moved from position to position.

The target electrodes are coupled through suitable target load load resistors 36 to a first common target buss 38 which is connected to a suitable positive D.C. power supply $V_T$. A switch 40 is connected across each target load resistor 36. In addition, each target is coupled to the cathode 42 of a diode 44, the anode 46 of which is coupled to a second common buss 48 which, in turn, leads through a common resistor 50 to a movable tap 42 of a potentiometer 54. A suitable positive D.C. voltage, for example $V_T$, is connected across the potentiometer. The potentiometer is adapted to be adjusted to control the signal level output of the diodes 44. The common buss 48 is also connected to the input of an inverter amplifier 56, the output of which is coupled to one of the input or control electrodes 58 of a multiple element gating device 60, for example a tetrode tube. The gating device includes a second control element 62 which is coupled through a delay line 64 to a source 66 of accurately controlled clock pulses 67. The gating device also includes an output electrode or anode 68 which is coupled through a load resistor 70 to power supply $V_T$. The output electrode 68 is also suitably coupled to any suitable utilization device or circuit (not shown) to which the desired train of output pulses 69 may be applied. The source 66 of clock pulses is also connected by a lead 71 to the input of the flip-flop 34.

In operation of the circuit of the invention, first let it be assumed that a train of ten evenly spaced pulses is to be provided. To obtain such a train of pulses, an output pulse is required from each position of the beam switching tube 10. In this case, each of the switches 40 is maintained in the open position. Each clock pulse from the source 66 applied to the flip-flop 34 causes an electron beam to switch by one position in the tube 10. When the beam flows to a target electrode 18, a negative output pulse 73, of generally rectangular form, appears at the target electrode. Each negative pulse is applied through the appropriate diode 44 to the input of the inverter amplifier, and a positive generally rectangular output pulse 75 appears at the output of the inverter amplifier and is applied to the control grid 58 of the tube 60. At the same time, the clock pulse which had caused the electron beam to switch into the position under consideration in the tube 10 has passed along the delay line 64 and reached the control grid 62 of the tube 60. The application of these two pulses to the tube 60 at the same time causes the tube 60 to conduct and provide a negative output pulse 69 therefrom. The next clock pulse switches the beam to the next position in the tube 10, and an output pulse from the next target electrode is applied with it to the tube 60 so that another output pulse 69 is generated. Thus, as each clock pulse switches the beam by one position in the tube 10, one output pulse of the desired train appears at the output of the tube 60. These output pulses are accurately spaced in time, and all have substantially the same shape.

If it is desired to provide a pulse train in which pulses are grounded and spaced according to a desired code, then the properly selected switches 40 are allowed to remain open and the others are closed. The tube positions at which the switches are open provide output pulses, and the other positions do not provide output pulses.

Figure 2:
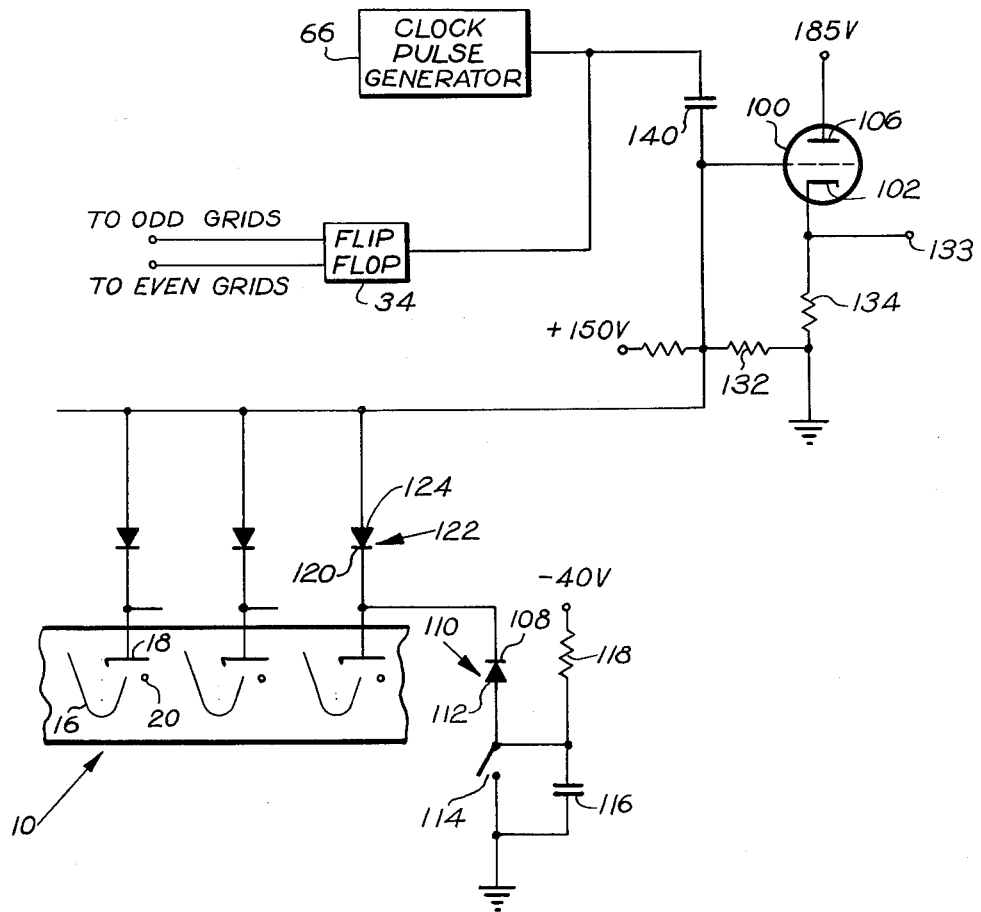
FIG. 2 is a schematic representation of a modification of the invention.

A modification of the invention is shown in FIG. 2 and includes some of the elements of FIG. 1 which carry the same reference numerals. In FIG. 2, the beam switching tube 10 is represented by three targets 18, all of which are connected to the same circuitry. Only one target circuit is shown in detail. This target circuit includes a gating tube 100 which, in this case, is a triode including cathode 102, control grid 104, and anode 106. Referring to the beam switching tube 10, each target electrode is connected to the cathode 108 of a diode 110, the anode 112 of which is connected through a switch 114 to ground. A capacitor 116 is connected across the switch 114, and the anode 112 of the diode 110 is connected through a suitable bias resistor 118 to a source of negative voltage of about 40 volts. Each target electrode 18 is also connected to the cathode 120 of a diode 122, the anode 124 of which is connected to a buss 126. The buss 126 is coupled, in turn, to the control grid 104 of the gating tube 100.

The control grid 104 of the gating tube 100 is also connected through a suitable bias resistor 130 to a source of positive D.C. voltage of about 250 volts. It is also connected through a resistor 132 to ground. The cathode 102 of the gating tube 100 is connected both to an output terminal 133 and through a cathode load resistor 134 to ground. The anode 106 of the gating tube 100 is connected to a suitable positive D.C. power supply of about 185 volts. The clock pulse generator 66 is coupled through a capacitor 140 to the control grid 102 of the gating tube 100 and to the input of flip-flop 34, as in FIG. 1.

In operation of the circuit of FIG. 2, if a switch 114 is open, the diode 110 is reverse-biased by the −40 volt supply, and when an electron beam flows to a target 18, it flows through the diode 122, the inductor 128, and the resistor 132 to ground. This current flow biases the control grid 104 of the gating tube 100 at such a negative voltage that the tube is cut off and any pulses applied thereto from the clock pulse generator do not appear at the output terminal 133.

When a switch 114 is closed in any of the target circuits and an electron beam flows to a target 18, the target is maintained at ground potential and the gate is allowed to remain open so that a pulse applied thereto from the clock pulse generator 66 appears at the output terminal 133. Thus, each time the clock pulse generator causes the flip-flop to switch an electron beam to a target having a closed switch, an output pulse appears at the terminal 133. Similarly, when the beam is switched into a position in which the target switch is open, then the output pulse from the clock pulse generator does not pass through the gate to the output terminal. Thus, the positions of the tube 10 which are to provide output pulses may be selected by closing the appropriate switches 114.

In addition to the primary advantage of providing accurately spaced pulses, another advantage of the circuit of FIG. 2 is that the switches 114, by which the desired array of output pulses may be obtained, may be remotely operated. The distance to which the switches may be extended is substantially unlimited since, if a switch is open, the capacitance of the line is limited by the capacitance of the diode 110. If the switch is closed, then the line is grounded and the capacitance does not affect the operation no matter how long the line is.

The circuit of FIG. 2, as well as the circuit of FIG. 1, may or may not require a time delay circuit. As described above, the output pulses from the target electrodes of the beam switching tube 10 are relatively accurately spaced. However, there may be a small variation in timing from pulse to pulse, and for some uses, this variation may be undesirable. The circuits of FIG. 1 and FIG. 2 overcome this problem by having the timing of pulses controlled by a clock which can be built to have very high accuracy. In both circuits of the invention, the clock pulse is applied to the gate sometime after the pulse from a target has been applied and preferably at about the average time center of these pulses. Thus, the presence of both pulses at the gate at the same time is insured. Both circuits may normally have the necessary time delay to achieve this pulse synchronism. Otherwise, suitable time delay circuits may be included in any suitable portion of the circuit.

Thus, it is clear that the invention provides a train of selected pulses which may be spaced with high precision and are not subject to variations in the beam switching tube itself and its associated circuitry. The uniformity of the train of output pulses depends substantially entirely on the accuracy and uniformity of the clock pulses, and the source of clock pulses may be designed and built to have almost infinite accuracy. Timing accuracy at least ten times greater than in the prior art may be achieved with ease by means of the present invention.

What is claimed is:

1. A pulse generating circuit including a multiple position electron beam switching tube having a cathode and a plurality of groups of electrodes; each group including a target electrode which receives an electron beam and produces an output signal therefrom, a spade electrode which holds an electron beam on its associated target electrode, and a switching electrode which serves to switch an electron beam from one group of electrodes to the next; a source of accurately timed clock pulses; a gating device; means coupling said source to said gating device and means coupling said target electrodes to said gating device so that said gating device produces an output pulse each time a clock pulse and a pulse from a target electrode are applied to said gating device simultaneously; and driving means coupled to said tube; said source also being coupled to said driving means.

2. The pulse generating circuit defined in claim 1 and including delay means between said source and said gating device for delaying the application thereto of a clock pulse for some time after the pulse has been applied to said driving means.

3. The pulse generating circuit defined in claim 1 and including circuit means coupled to the target electrodes of said tube for preventing selected ones of said targets from providing output pulses to said gating device.

4. The pulse generating circuit defined in claim 1 and including a target load resistor coupled to each target electrode of said tube, a switch connected across each target load resistor, an inverter amplifier having an input and an output, each target being coupled through a diode to the input of said inverter amplifier, the output of said inverter amplifier being coupled to said gating device whereby pulses from said tube are applied to said gating device.

5. A pulse generating circuit including a multiple position electron beam switching tube having a cathode and a plurality of groups of electrodes; each group including a target electrode which receives an electron beam and produces an output signal therefrom, a spade electrode which holds an electron beam on its associated target electrode, and a switching electrode which serves to switch an electron beam from one group of electrodes to the next; means connecting said switching electrodes in two sets with alternate electrodes in each set; a flip-flop having an input and two outputs, the outputs being connected one each to the sets of switching electrodes; a source of clock pulses; a gating device having two control electrodes; a delay line coupled between said source and one of the control electrodes of said gating device; said source also being coupled to the input of said flip-flop; and an inverter amplifier having an input and an output; each of said target electrodes being coupled through a diode to the input of said inverter amplifier; the output of said inverter amplifier being coupled to the other control element of said gating device; said gating device having an output electrode from which a train of accurately timed pulses is obtained.

6. A pulse generating circuit including a multiple position beam switching tube having a plurality of output electrodes from each of which an output signal may be obtained, an electronic gating device having a plurality of electrode means, a clock pulse generator coupled to said gating device and adapted to generate accurately spaced pulses for application to said device, each of said output electrodes of said tube being coupled to said gating device, and means coupled to each output electrode for operating each one in two states, in one state an output electrode rendering the gating device inoperative and unable to provide an output signal in response to a pulse from said clock pulse generator, and, in the other state, an output electrode rendering the gating device operative and able to pass an output pulse when signals from said clock pulse generator and an output electrode are applied thereto simultaneously.

7. The circuit defined in claim 6 wherein said means coupled to each target electrode comprises switch means which, in one position cuts off the gating device and, in the other position, allows the gating device to provide an output pulse in response to pulses applied thereto simultaneously by the clock pulse generator and by an output electrode, each output electrode thus being adapted either to provide or not to provide an output pulse from said gating device.

References Cited in the file of this patent
UNITED STATES PATENTS 2,795,732    Kuchinsky _____ June 11, 1957
2,963,551    Schreiber _____ Dec. 6, 1960

UNITED STATES PATENT OFFICE
CERTIFICATE OF CORRECTION

Patent No. 3,028,520                                            April 3, 1962

Roger W. Wolfe et al.

It is hereby certified that error appears in the above numbered patent requiring correction and that the said Letters Patent should read as corrected below.

Column 2, line 18, for "edges" read -- edge --; line 67, strike out "load", second occurrence; column 3, line 52, for "grounded" read -- grouped --.

Signed and sealed this 31st day of July 1962.

(SEAL)
Attest:

ERNEST W. SWIDER                                      DAVID L. LADD
Attesting Officer                                      Commissioner of Patents